US010924345B2

United States Patent
Kintzler (10) Patent No.: US 10,924,345 B2
(45) Date of Patent: Feb. 16, 2021

(54) METHOD FOR CHANGING THE CONFIGURATION OF CONNECTED NETWORKS

(71) Applicant: Siemens Aktiengesellschaft, Munich (DE)

(72) Inventor: Florian Kintzler, Vienna (AT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 56 days.

(21) Appl. No.: 16/446,769

(22) Filed: Jun. 20, 2019

(65) Prior Publication Data

US 2019/0394090 A1 Dec. 26, 2019

(30) Foreign Application Priority Data

Jun. 20, 2018 (EP) .................................. 18178848

(51) Int. Cl.
*H04L 12/407* (2006.01)
*H04L 12/24* (2006.01)

(52) U.S. Cl.
CPC ........ *H04L 41/0816* (2013.01); *H04L 12/407* (2013.01); *H04L 41/14* (2013.01); *H04L 41/16* (2013.01)

(58) Field of Classification Search
None
See application file for complete search history.

(56) References Cited

U.S. PATENT DOCUMENTS

| 7,295,960 | B2* | 11/2007 | Rappaport | H04L 43/00 703/13 |
| 2006/0182075 | A1 | 8/2006 | Brunner et al. | |
| 2007/0214242 | A1* | 9/2007 | Watanabe | H04L 41/12 709/220 |
| 2009/0228974 | A1 | 9/2009 | Ivanov | |
| 2015/0236901 | A1 | 8/2015 | Nagashima | |
| 2017/0005870 | A1 | 1/2017 | Narain et al. | |
| 2017/0171026 | A1* | 6/2017 | Lucas | G06F 11/1441 |
| 2017/0351226 | A1* | 12/2017 | Bliss | G05B 19/4063 |
| 2018/0018230 | A1* | 1/2018 | Leggette | G06F 11/1076 |
| 2019/0215246 | A1* | 7/2019 | Kawalay | H04L 41/147 |

FOREIGN PATENT DOCUMENTS

WO  WO2005006654  *  1/2005  ............. H04L 12/24

* cited by examiner

*Primary Examiner* — Mohamed Ibrahim
(74) *Attorney, Agent, or Firm* — Cozen O'Connor (57) ABSTRACT

A method for changing the configuration of at least two connected networks which consist of components and which are interconnected via at least one component, wherein at least one of the at least two networks is configured as a communication network, where digital models of the at least two networks are created based on network analyses, digital component models are created for the at least one connecting component, deriving a sequence of the configuration change is derived based on the digital models of the at least two networks and the digital component models for the at least one connecting component, the sequence of the configuration change is disassembled into decentrally executable sequence units and the decentrally executable sequence units distributing and executing while taking temporal and spatial dependencies on at least one decentralized sequence control unit in at least one of the at least two networks into account.

15 Claims, 2 Drawing Sheets

METHOD FOR CHANGING THE CONFIGURATION OF CONNECTED NETWORKS

BACKGROUND OF THE INVENTION

1. Field of the Invention

The present invention relates to a method for changing the configuration of at least two connected networks, where the at least two networks consist of components, the at least two networks are connected by at least one component, and where at least one of the at least two networks is configured as a communication network.

2. Description of the Related Art

Nowadays there are systems in many fields, such as energy supply, building services engineering, manufacturing and automation and/or in traffic control technology, which consist of at least two different networks. These networks typically comprise a plurality and up to a large number of components and are linked or connected to one another via at least one component.

Hereby, for example, at least one of the at least two networks are formed by a communication network which consists of components, such as computer units, routers, switches, access units, or IP terminal devices, and corresponding connections (e.g., cables, glass fibers, links, or wireless communication connections). The communication network typically makes available an infrastructure for transferring information and/or data, for example, in the form of data packages between different components of the communication network itself or for communication with components of an at least second network. The communication network thus offers a communication structure via which implementations and applications running on the components can communicate. Furthermore, some components of the communication network, for example, intermediary components (e.g., switches) can also be realized as a virtual or software solution and not as a physical hardware solution.

The at least second network of the system is formed by mostly physical units as network components. In the energy field, in particular in "smart grids", this network is formed by an energy supply network. As components, the network can comprise physical units, for example, consumers, generators, metering units, measuring devices, transformer stations, or power lines. In the field of building services engineering, in particular, "smart buildings", the at least second network can comprise, for example, sensors by which different states (e.g., temperature, air humidity, $CO_2$ content of the air, brightness, or smoke detectors) in a building or in individual building regions or rooms are determined, as well as actuators by which the states determined by the sensors are influenced. In the automation and manufacturing field, the at least second network can consist of physical components, such as production units, or production stations, which are logically linked to one another by operational processes or a production process.

The at least two networks are usually functionally linked or connected by means of at least one component. That is, for example, components of the communication network can, for example, control, monitor or regulate components of the at least second network, or data (e.g. measurement values, or sensor states) from components of the at least second network can influence the communication network.

In a system consisting of an energy supply network and a communication network, for example, via components of the communication network or implementations running on these components, measurement values from the energy supply network can be continually requested, stored and, if required, further processed centrally. Furthermore, for example, based on measurement values, components of the energy supply network can be controlled or monitored via corresponding instructions/control commands. In building services engineering, measurement values of the sensors of the physical network, for example, via components of the communication network can be requested and evaluated to actuate actuators of the physical network, for example, as a consequence via control or regulating commands. Furthermore in the case, for example, of modern production plants, physical components of the physical network are controlled and monitored accordingly by mostly software-driven components from which interaction with a communication network occurs. If relevant, in the domain of modern production plants by means of the communication network, a linkage to an energy supply network can also be provided in order, for example, to monitor and/or ensure an autonomous power supply to the production plant.

A topology of the communication network can be, for example, largely identical with a topology of the second network connected or linked to the communication network. Typically, however, the topology of the communication network differs from the topology of the at least second network (e.g., energy supply network, production plant, building services engineering network, or traffic control system) to which the communication network is connected or linked. Thus, for example, in a production plant, the structure or configuration of the communication network can largely match a layout of the production plant or can be configured completely different, e.g., a linear production line that is constructed in the logical sequence of the production steps is connected to a communication network, the components of which are connected, for example, via a central access point to a wireless communication network (e.g., a wireless LAN). In building services engineering, for example, sensors and/or actuators which are mounted, for example, in spatial proximity, can be connected, in one case by means of a wireless connection (e.g., wireless LAN) and in another case, via a wired connection, to the communication network. In the energy supply field, an existing energy supply network can be partially used for transmitting data between components (e.g., powerline communication) or there is an additional wire-bound or wireless communication network which is used for the transmission of data. Often, the structure or configuration of the communication networks is not or only partially known, in particular in the case of an inclusion of public networks (e.g. telephone network, data network, or mobile radio network) or on use of "intermeshed" networks in which data/information is transmitted from one network node to the next as far as a target node.

Furthermore, the topologies or configurations of the at least two connected networks can change dynamically. Thus, for example, in a communication network, by adding, removing or changing a component and/or by changing an implementation running on one or a plurality of components (e.g., version change) data transfer routes, or a manner of data transfer (e.g., continuous transfer, or bulk transfer) can change and thereby influence the at least second network. With this, for example, maloperations, restrictions in the availability of components and possibly instabilities and/or failures in the network connected to the communication network can arise.

On the other hand, structural and/or configuration changes in at least the second network (e.g., switching over or failure of lines or components in the energy network, addition/removal or upgrades of components in energy or building services engineering networks, or conversion or re-equipping of a production plant) can have repercussions for the connected communication network. With this, an increase in data traffic or disruptions in the data transfer, etc. can arise in the communication network if changes of physical components and thus of the configuration of the at least second network are controlled and implemented centrally. It is therefore important for the operability of the at least two connected networks that possibly negative influences from structural or configuration changes in at least one of the networks are minimized and/or kept small and that a sequence of a configuration change of one or more components in one of the networks can be easily interrupted and possibly reversed without endangering the stability and availability of the overall system consisting of at least two networks.

Currently, for example, configuration changes to a network structure, for example, new installations and/or reconfigurations of components, in particular implementations used in one of the networks (e.g., the communications network), are frequently planned manually and implemented in accordance with this manual planning. However, possible consequences of the respective configuration changes through, for example, changes to one or more components or to the network structure of the one network in the at least second network can scarcely be taken into account dynamically during the planning. Above all, in the case of components via which the at least two networks are connected, for example, conditions are defined in the process planning that are to be observed in the at least two networks during the respective configuration change. These conditions can be manually monitored, for example, during an execution of the respective configuration change, but an automatic recognition and, in particular, reduction or prevention of negative interactions and infringement of these conditions is scarcely brought about thereby.

SUMMARY OF THE INVENTION

It is therefore an object of the invention to provide a method for configuration change of connected networks in which effects of the respective configuration change in one of the at least two networks on, above all, a stability and/or an availability of the networks and, the effect in the event of an error in the respective configuration change are substantially reduced.

This and other objects and advantages are achieved in accordance with the invention by a method for changing the configuration of connected networks of the type mentioned in the introduction, having the following steps of creating digital models of the at least two networks on the basis of network analyses; creating digital component models for the at least one connecting component, wherein in a respective digital component model, at least one respective interaction of the at least one connecting component is represented via properties of one of the at least two networks; deriving a sequence of the configuration change based on the digital models of the at least two networks and the digital component models for the at least one connecting component; disassembling the sequence of the configuration change into decentrally executable sequence units; and distributing and executing the sequence units while taking temporal and spatial dependencies on at least one decentralized sequence control unit in at least one of the at least two networks into account.

The main aspect of the inventively proposed solution lies therein that via dynamic network analyses, digital models of the at least two networks and also digital component models are created, where in the modeling of the digital component models in which the respective interactions of the at least one component connecting the networks are represented, consequences of the configuration change can also be easily taken into account. Ideally, properties and conditions of the at least two networks are taken into account in the digital component models. Such properties and conditions are, for example, availability/capacities of connections for, for example, data, energy, control commands, permissible and/or maximum possible network loading, or permissible effects from control commands through a sequence of an application on the respective network. The digital component models can also represent properties of sub-components or, in the case of a computer unit on which one or more implementations or applications are running, an explicit behavior of an application in the respective digital component model can also be represented.

Based on the digital models, a sequence of the configuration change that can be disassembled into decentrally executable sequence units is derived, whereby temporal dependencies are taken into account. The sequence units can be transferred for an execution on at least one decentralized sequence control unit in one of the at least two networks according to spatial and temporal dependencies. With this, the sequence of the configuration change can be optimized such that negative influences on availability and stability are largely minimized and/or that conditions given in the digital models (e.g., maximum and/or permissible network capacities, specifications for utilization, sequence, or dependencies between implementations) are fulfilled.

Furthermore, the creation and execution of the configuration change of the connected networks takes place largely dynamically, i.e., a manual planning and/or monitoring by, e.g., an operator can be largely reduced and thereby costs saved. The subdivision of the sequence of the configuration change to decentrally executable sequence units or the distribution of the sequence units to one, or ideally a plurality of decentralized sequence control units in one of the at least two networks enables the execution of the configuration change to be delimited locally as far as possible. As a result, the effects of the configuration change on the networks can be further reduced.

It is further advantageous if, based on the execution of the locally decentrally executable sequence units, the digital models of the at least two networks and/or the digital component models are continually adapted. As a result, the sequence of the configuration change can easily be continually adapted to the actual circumstances in one of the at least two networks, and/or dynamically optimized.

It is also favorable if for the at least one decentralized sequence control unit at least one component is firmly established in one of the at least two networks. Alternatively or additionally for the sequence control unit, at least one component in one of the at least two networks, in particular in the communication network can be selected dynamically based on the configuration change, which has, for example, an optimum positioning for at least one part of the configuration change. Thus, the sequence of the configuration change can be decentrally distributed in one of the two networks (preferably in the communication network. The components which are each used as a decentralized sequence control unit can thereby function, for example, as a type of proxy server), i.e., a communication interface or a relaying computer in the network, for the execution of the respective locally decentralized executable sequence unit. As a result, for example, a network traffic or a data transfer can be reduced and a dependency of the configuration change on an availability of the communication connections to a central control component in one of the at least two networks can be avoided.

Ideally, one or more components can be specified or can be dynamically selected as the sequence control unit, by which a control functionality (e.g., in the form of an implementation or application) is included. These components can then perform the respective sequence units or the respective configuration change. If a component specified or dynamically selected as a sequence control unit has no control functionality, this component can be dynamically equipped with the control functionality, for example, before or in parallel with the distribution of the executable sequence units. Thus, according to the respective configuration change, at least one arbitrary component can be specified or dynamically selected in one of the at least two networks based on the sequence of the configuration change to function as a sequence control unit.

The execution of the respective decentrally executable sequence unit ideally occurs in the network components affected by the respective configuration change. That is, the execution of the configuration change is thereby delimited as locally as possible and the effects reduced to a required extent. For this purpose, the sequence of the configuration change is advantageously created as a temporally and spatially decentrally controllable structure via which it is defined in a simple manner which steps of the configuration change must be performed on which component at which time point, and which also enables a resetting into a starting state in the event of an error.

In a preferred embodiment of the inventive method, the sequence of the configuration change is created, stored and administered by a central control component in one of the at least two networks, in particular, in the communication network. Thus, the creation and administration of the sequence of the configuration change can be performed and, if relevant, monitored very easily at a central site. Ideally, a transfer of the locally decentrally executable sequence units to the at least one specifiable decentralized sequence control unit is performed by the central control component.

In an alternative embodiment of the inventive method, the sequence of the configuration change can be created, stored and administered decentralized in a coordinated manner in one of the at least two networks, in particular, in the communication network. For this purpose, for example, the at least one specifiable, decentralized sequence control unit can be used. In the case of a decentralized creation and administration of the sequence of the configuration change, it can be configured as coordinated calculation operations in the at least one sequence control unit. Furthermore, a combination of a central creation of the sequence of the configuration change, e.g., in a central control component and a decentralized optimization, for example, in the at least one specifiable decentralized sequence control unit is also conceivable.

It is further advantageous if for a continual adaptation of the digital component models, learning algorithms are used or a behavior of the at least two connected networks is utilized. As a result, the digital component models can be dynamically refined and, for example, interactions through, for example, implementations or applications between the at least two connected networks can be taken into account still better in the configuration change.

In another embodiment of the inventive method, a network analysis of at least one of the at least two networks is performed automatically or at least partially automatically. Particularly in the case of networks in which topology changes often occur, for example, in a communication network, via at least partially automatically performed network analyses, the creation of a falsified or faulty digital model and its use for the sequence of the configuration change can be prevented. In small networks and/or networks with a, for example, well documented or rather a static network topology (e.g., an energy supply network, or production plants) the corresponding digital model can also be manually maintained or adapted to changes. Furthermore, the use of automatically or at least partially automatically performed network analyses as the basis for the respective digital network model has the advantage that reactions to changes in the topology (e.g., on a failure of lines or connections, or changes of routers in the communication network) can occur rapidly and dynamically.

In a preferred embodiment of the inventive method, at least one of the at least two networks comprises an energy supply network, a production system or a building management system.

BRIEF DESCRIPTION OF THE DRAWINGS

The invention will now be described in an exemplary manner based on the attached figures, in which.

DETAILED DESCRIPTION OF THE EXEMPLARY EMBODIMENTS

Figure 1:
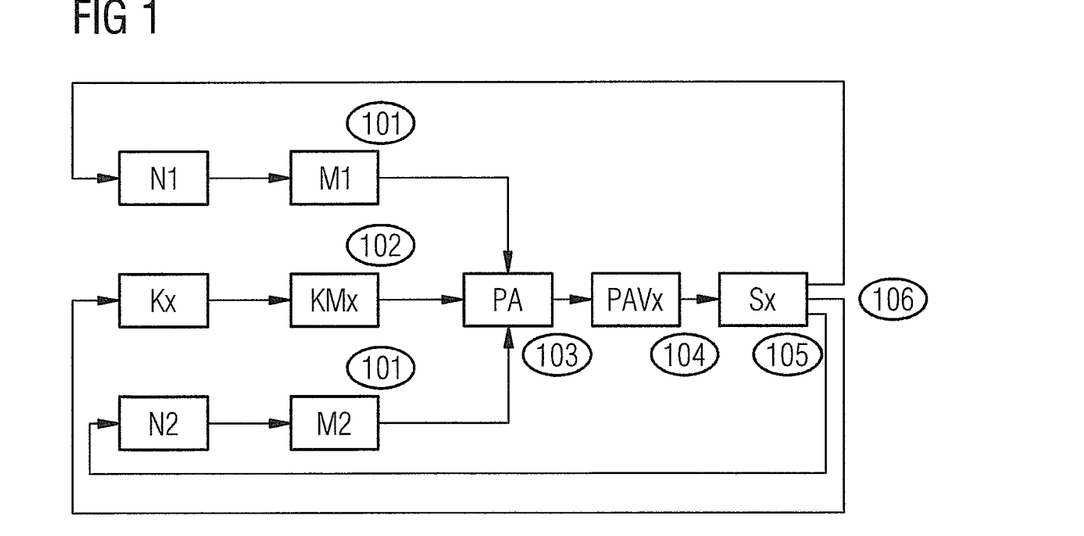
FIG. 1 is an illustration of an exemplary sequence of the inventive method for changing the configuration of connected networks.

FIG. 1 shows, by way of example and schematically, a sequence of the method for configuration change in at least two connected networks N1, N2, where one of the at least two networks N1, N2 (for example, a first network N1) is configured as a communication network. The at least second network N2 can be configured, for example, as an energy supply network, a production system or plant or as a building management system. The at least two networks N1, N2 consist of components. For example, the first network N1 configured as a communication network can comprise components such as computer units, routers, switches, access units, or IP terminal devices, and corresponding connections (e.g. cables, glass fibers, links, wireless communication connections). The at least second network N2 has, depending on its configuration (e.g. an energy supply network, a production system, or a building management system) corresponding physical units (e.g., consumers, generators, metering units, measuring devices, transformer stations, power lines, production units, production stations, sensors, or actuators) as network components. The at least two networks N1, N2 are connected to one another by at least one component Kx.

For the method for configuration change of the at least two connected networks N1, N2, in a network modeling step

101, digital models M1, M2 of the at least two networks N1, N2 are created based on network analyses. The network analysis of the at least two networks N1, N2 can be performed automatically or at least partially automatically. In the network analysis, a topology of the respective network N1, N2 is analyzed automatically or partially automatically as the basis for the respective digital model M1, M2. In simple (i.e., with few components and/or changes) and/or well documented networks N1, N2, an analysis and the creation and administration of the network model M1, M2 can also be undertaken manually (where relevant). A creation of the network model M1, M2 in the network modeling step 101 can occur independently from one another and asynchronously, but also in parallel with one another.

In a component modeling step 102, digital component models KMx are created for the at least one component Kx, by which the at least two networks N1, N2 are connected. In a respective component model KMx, at least one respective interaction of the at least one connecting component Kx is represented. The respective interaction can be described, for example, via properties of both the networks N1, N2 or sub-components. If an implementation or application having an influence on the at least two networks N1, N2 is running on the connecting component Kx, then a behavior of this implementation or application can be explicitly modeled. Component models KMx can herein be learned, for example, from a behavior of the at least two connected networks N1, N2 or, for example, refined by the use of learning algorithms.

In a sequence creation step 103, based on the digital models M1, M2 of the at least two networks N1, N2 and the digital component models KMx for the at least one connecting component Kx, a sequence PA of the configuration change is created. The sequence PA of the configuration change is created as a temporally and spatially decentralized controllable structure, whereby the conditions specified by the sequence PA in the models M1, M2, KMx must be met. Such conditions are, for example, specifications relating to network loadings, dependencies of network components and/or implementations. With the sequence PA of the configuration change, it is specified in principle at which time point, on which components which step of the configuration change is performed. Furthermore, in the event of an error, a configuration change can thereby be very easily reset to a starting state.

A creation of the digital models M1, M2, KMx of the at least two networks N1, N2 and the at least one connecting component Kx in the network modelling step 101 or in the component modelling step 102 and a derivation of the sequence PA of the configuration change in the sequence creation step 103 can be performed, for example, centrally. The sequence PA of the configuration change and the digital models M1, M2, KMx can thereby be created, stored and administered centrally. For this, for example, a central control component present in one of the at least two networks N1, N2 which is present, for example, in the first network N1 configured as a communication network, can be used.

Alternatively, creation of the digital models M1, M2, KMx in the network modeling step 101 or in the component modeling step 102 and the derivation of the sequence PA of the configuration change in the sequence creation step 103 can also be performed in a decentralized manner via communicating network units. That is, the sequence PA of the configuration change is created, stored and administered decentrally in one of the at least two networks N1, N2, in particular in the communication network N1.

In a disassembly step 104, the sequence PA of the configuration change is disassembled into decentrally executable sequence units PAVx. In an execution step 105, the sequence units PAVx or a control are distributed over the sequence units PAVx to at least one (typically a plurality of) sequence control units Sx. The sequence control units Sx are (in particular, in the first network N1 configured as a communication network) arranged decentrally, for example, dependent upon the respective configuration change, e.g., in spatial proximity to components, which are to be changed. As the sequence control units Sx, for example, a single component (e.g., in the case of small networks N1, N2 and/or only very local changes) or a plurality of components can be specified or selected dynamically on the basis of the sequence PA. Thereby, as sequence control units Sx, for example, components Kx that have a control functionality for performing the sequence units PAVx can be specified or dynamically selected. Alternatively, any desired components Kx can also be selected, in particular, dependent upon the sequence PA of the configuration change (e.g., based on spatial circumstances in the network) and equipped in the execution step 105 with the corresponding control functionality in order to be able to function as a sequence control unit Sx.

With the aid of the sequence control unit Sx, the sequence PA of the configuration change or the sequence units PAVx are distributed spatially and temporally in at least one of the networks N1, N2. If a central creation of the sequence PA by means of a central control component is provided, then the distribution and/or transfer of the decentrally executable sequence units PAVx to the sequence control units Sx and the can be performed by the central control component. If relevant, the central control component can also assume an equipping of components Kx with the control functionality.

Following the distribution, the decentrally executable sequence units PAVx are executed in the execution step 105, taking into account temporal dependencies and/or stipulations on the pre-determined decentralized sequence control units Sx. The sequence control units Sx thus become a type of proxy server for the respective sequence unit PAVx or a part of the sequence PA of the configuration change that is stipulated by the respective sequence unit PAVx, so that a network traffic (in particular, in the communication network N1) can be reduced.

In an optimization step 106, the digital models M1, M2 of the at least two networks N1, N2 and/or the digital component models Kx are continually adapted. As a basis therefore, an embodiment of the respective decentrally executable sequence units PAVx can be called upon. For a continual adaptation, particularly of the digital component models KMx, for example, learning algorithms can be used or a behavior of the at least two connected networks N1, N2 can be called upon. The dynamic optimization of the sequence PA is then subsequently taken into account by the at least one sequence control unit Sx. Thereby, the decentralized, specifiable sequence control units Sx themselves can be the target of a configuration change. Since the sequence control units Sx are arranged only in one of the at least two networks N1, N2 (usually in the first network N1 configured as a communication network) for example, only interactions or effects on this respective network N1, N2 (e.g., the communication network) are integrated into their modelling. Usually, the sequence control units Sx have no connection to the at least second network N2.

Figure 2:
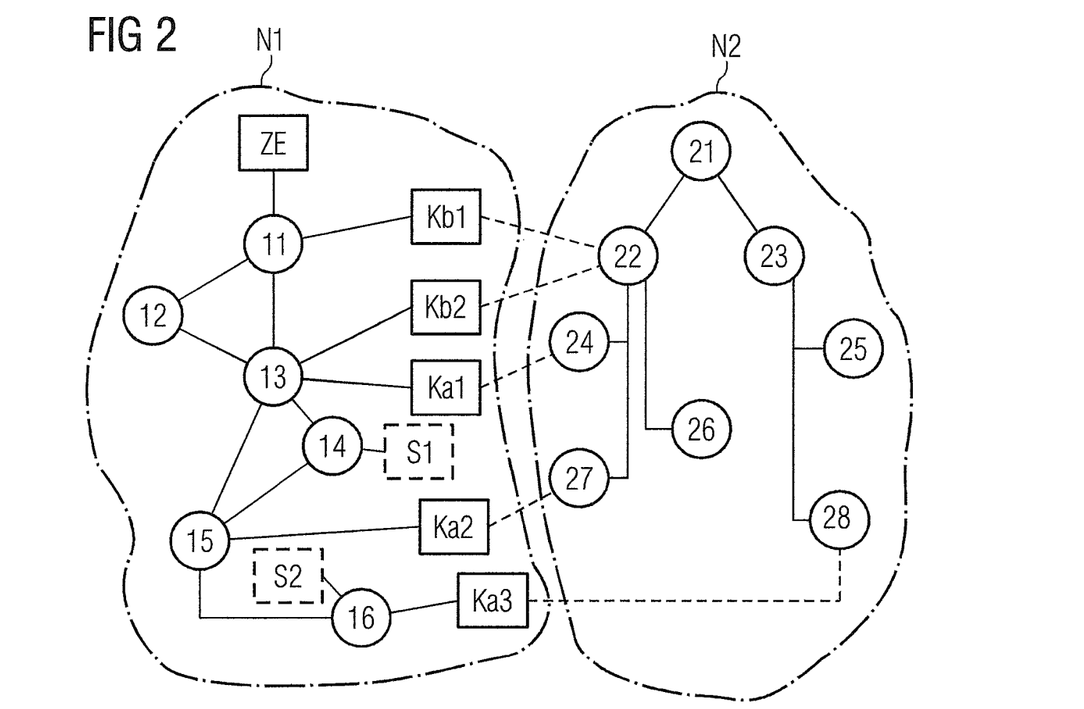
FIG. 2 is a schematic illustration of an exemplary use of the inventive method in an energy supply network which is connected via components to a communication network.

FIG. 2 shows an exemplary use of the inventive method for changing the configuration of two connected networks N1, N2. A first network N1 is configured as a communication network. The communication network N1 has a plurality of components 11 to 16, Ka1, Ka2, Ka3, Kb1, Kb2 (e.g., computer unit, routers, switches). Furthermore, the communication network N1 comprises a central control component ZE for a control, monitoring and supervision of a status of the components 11 to 16, Ka1, Ka2, Ka3, Kb1, Kb2 and processes in the communication network N1. A second network N2 is an energy supply network that also consists of a plurality of components 21 to 28 (e.g., consumers, generators, metering units, measuring devices, transformer stations, or power lines).

The two networks are connected to one another via the connecting components Ka1, Ka2, Ka3, Kb1, Kb2 of the communication network N1. These components Ka1, Ka2, Ka3, Kb1, Kb2 can be configured, for example, as computer units on which different implementations run. That is, therewith different types of connecting components Ka1, Ka2, Ka3, Kb1, Kb2 can be provided. For example, a first implementation for recording, storing and passing on measurement values on the energy supply network N2 is carried by a first component type Ka1, Ka2, Ka3. A second implementation is performed, for example, by a second component type Kb1, Kb2 through which components 21 to 28 of the second network N2 are monitored and controlled via control commands.

If a configuration change is to be implemented in one of the connected networks N1, N2, such as an installation of a new implementation or a new version of an implementation on the components Ka1, Ka2, Ka3 of the first type in the communication network N1, then this configuration change can also influence the second network N2 or the energy supply network N2 or at least have an influence on the components 24, 27, 28 that are connected to the components Ka1, Ka2, Ka3 affected by the configuration change. For example, an energy usage in the corresponding components 24, 27, 28 of the energy supply network N2 can be influenced. Therefore, for the configuration change, the inventive method for changing the configuration of connected networks N1, N2 is run through.

Therefore, in the network modeling step 101, digital models M1, M2 of the two networks N1, N2 are generated automatically and/or corresponding digital models M1, M2 are adapted, if digital models M1, M2 from an earlier configuration change already exist. Furthermore, the digital component models KMx are created or, if relevant, adapted in the component modeling step 102. From the digital models M1, M2 of the networks N1, N2 and from the component models KMx, for example, a network structure and topology and the components contained by the respective networks N1, N2 and their properties are passed on. In the communication network N1, this relates, for example, to components such as routers and the connecting components Ka1, Ka2, Ka3, Kb1, Kb2 and properties such as data transfer routes, transfer capacities, protocols used, data transmission frequencies, or transfer rates. In the energy supply network N2, components, such as consumers, transformer substations, generators, power lines and connections of the connecting components Ka1, Ka2, Ka3, Kb1, Kb2 to the energy supply network N2 or properties such as line capacities, or switch-over capabilities, can be represented in the models M2, KMx.

The creation and administration of the digital models M1, M2 and the component models KMx can be adopted, for example, by the central control components ZE.

Furthermore, in the communication network N1, decentrally arranged sequence control units S1, S2 are specified. As the sequence control unit S1, S2, for example, components 11 to 16, Ka1, Ka2, Ka3, Kb1, Kb2 present in the communication network (in particular, connecting components Ka1, Ka2, Ka3, Kb1, Kb2) which ideally have a control functionality can be used. Thereby, for example, the function of the sequence control unit S1, S2 and/or the control functionality can be integrated into the respective component 11 to 16, Ka1, Ka2, Ka3, Kb1, Kb2, for example, in the form of an application. This integration can also be derived dynamically after the creation of the sequence PA of the configuration from this sequence PA and carried out dynamically in the execution step 105. Alternatively or additionally, new components can be installed, for example, as dedicated, decentralized sequence control units S1, S2 (as shown, for example, in FIG. 2), whereby, for example, distinct physical units are used for the respective sequence control unit S1, S2.

In the sequence creation step 103, based on the digital models M1, M2 of the networks N1, N2 and the component models KMx, the sequence PA of the configuration change is created. The sequence PA can thereby be created and administered in the central control component ZE and from there, after the disassembly step 104, distributed in the form of the sequence units PAVx to the specified sequence control units S1, S2 in the communication network N1. Alternatively, in particular where there is a lack of a central control component ZE, the sequence PA of the configuration change can be created and administered itself as a coordinated, distributed calculation operation in the specified, decentralized sequence control units S1, S2. Also conceivable, however, is a combination of a centralized creation of the sequence PA of the configuration change in the central control components ZE and a decentralized optimization of the sequence during the optimization step 106 in the sequence control units S1, S2.

In the automatic determination of the sequence PA of the configuration change, for example, in the implementation shown by way of example in FIG. 2 of the inventive method based on the models M1, M2 of the networks N1, N2 and of the component models KMx, it can be ascertained in the sequence creation step 103: that an effect of the configuration change in the components Ka1, Ka2, Ka3 based on the properties of the interactions described in the component models KMx finds expression through the new implementation or new version of an implementation, for example, the components 24, 27, 28 and their respective connections in the energy supply network N2, where if relevant, the component 26 and its respective connection can be affected; and that furthermore in the communication network N1, the region affected by the configuration change in the sub-region can be subdivided, i.e. a first sub-region can be formed that has effects on the components 24, 26, 27 and their connections to the energy supply network N2, and a second sub-region which takes account of the effects on the components 28 and its connections in the energy supply network N2. Thereby, for example, for the first sub-region, a first sequence control unit S1 and, for the second sub-region, a second sequence control unit S2 can be specified or can be selected dynamically based on the sequence PA of the configuration change.

That is, from the models M1, M2, KMx, the result in the sequence creation step 103, for example, in relation to the energy supply network N2, is that from its viewpoint it would be useful to start the configuration change (i.e., the installation of the implementation) in the smaller, second sub-region that concerns fewer components, for which sub-region, for example, the second sequence control unit S2 can be utilized. Only after a successful execution in the second sub-region could the configuration change be performed, for example, also in the first sub-region, by means of the first sequence control unit S1, in which substantially more components are affected.

Furthermore, in the sequence creation step 103 based on the digital models M1, M2 of the networks N1, N2 and the digital component models, the effects of the configuration change on the first network N1 or the communication network N1 itself can also be taken into account, such as additional data traffic or temporally changed behavior during the data transfer (e.g., a "bulk transfer" rather than a continuous data transfer). These effects include, for example, a transfer of the new implementation to the respective components Ka1, Ka2, Ka3, on central generation of the sequence AP, or a distribution of the sequence units PAVx to the sequence control units S1, S2. In order, for example, to keep the data traffic in the communication network N1 low, it can be planned, for example, into the sequence AP of the configuration change to transfer the new implementation or the new version of the implementation firstly to the sequence control units S1, S2 to keep the number of components 11 to 16, Ka1, Ka2, Ka3, Kb1, Kb2 in the communication network N1 that are influenced by the configuration change as low as possible.

Thus, there results, for instance, for the example shown in FIG. 2 of the inventive method in the sequence creation step 103, a sequence AP for the configuration change or the installation of a new implementation or implementation version on the components Ka1, Ka2, Ka3 that can be disassembled, for example, in the disassembly step 104, into a plurality of decentrally executable sequence units PAVx which stand in a temporal relation to one another.

The sequence AP of the configuration change could appear, for example, as follows: transfer of the new implementation to the first sequence control unit S1, performed, e.g. by the central control component ZE; transfer of the new implementation to the second sequence control unit S2, performed, e.g., by the central control component ZE; transfer of a first sequence unit PAV1 to the first sequence control unit S1, for example, by means of the central control component ZE, whereby the first sequence unit can have, e.g., a plurality of steps, such as waiting for initiation by the central control component ZE, installation of the new implementation or implementation version to the components Ka1, Ka2 and notification concerning installation success (e.g., by validation in relation to a model) to, e.g., the initiating, central control component ZE; transfer of a second sequence unit PAV2 to the second sequence control unit S2, for example, via the central control component ZE, whereby the second sequence unit PAV2 can also have a plurality of steps such as waiting for an external initiation, installation of the new implementation or implementation version on the component Ka3, initiation of the first sequence unit PAV1 on the first sequence control unit S1 on successful installation and notification concerning installation success to initiating components (e.g., central control component ZE); initiation of the execution of the second sequence unit PAV2 on the second sequence control unit S2 by, for example, the central control component ZE.

The above-described sequence PA, of the configuration change can, by way of example, be started, e.g., via external initiation via the central control component ZE, e.g., the start of the implementation installation in the communication network, in the execution step 105 and then run accordingly, where the central control component ZE partially also assumes the function of a sequence control unit Sx (in particular, for the transfer procedures). The sequence units PAVx of the sequence PA of the configuration change are then executed decentrally on the sequence control units S1, S2 according to the specified temporal dependencies, e.g., second sequence unit PAV2 before the first sequence unit PAV1.

The sequence PA of the configuration change described by way of example making reference to FIG. 2 is kept relatively simple, but can be designed, for example, as complex as desired. For example, a validation of the installation success can occur via models in the standby mode with an old version of the implementation or the sequence PA or the execution of the sequence units PAVx are to be temporally monitored or a "rollback" of the sequence PA is also taken into account.

In an optimization step 106, the digital models M1, M2 of the at least two networks N1, N2 and/or the digital component models Kx and the sequence AP of the configuration change are continually adapted.

Figure 3:
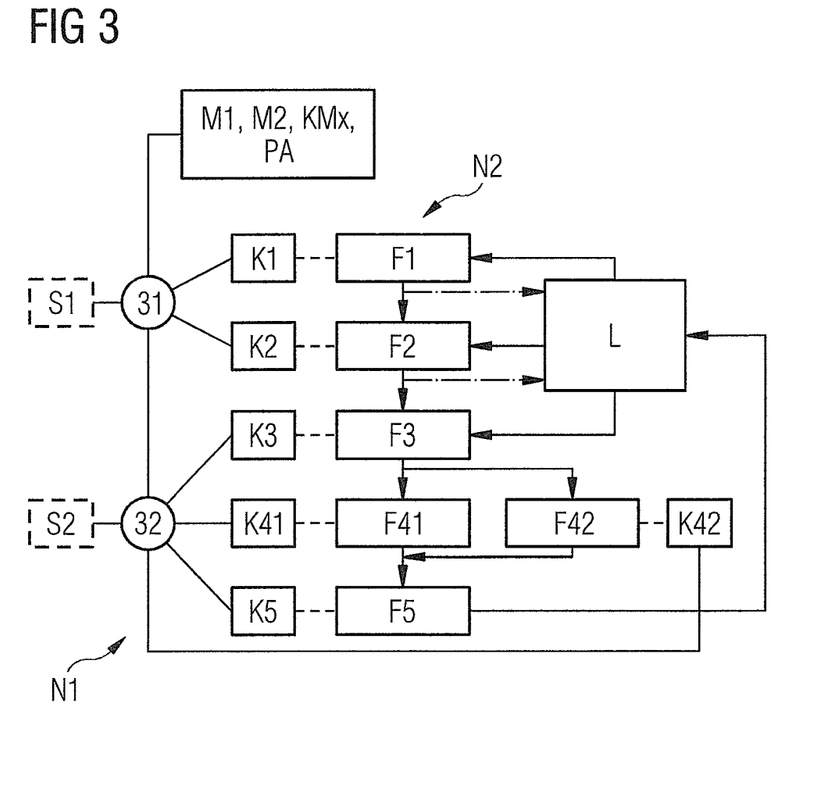
FIG. 3 is a schematic illustration of an exemplary use of the inventive method in a production plant that is connected via components to a communication network.

FIG. 3 shows a further exemplary use of the inventive method for changing the configuration of two connected networks N1, N2. Herein, the first network N1 is again a communication network that consists of the components 31, 32, K1, K2, K3, K41, K41, K5. Furthermore, decentralized sequence control units S1, S2 can be provided in the communication network N1, being formed, e.g., by distinct computer units and being installed, e.g., for a configuration change in the communication network.

The second network N2 is formed in the implementation shown by way of example and schematically in FIG. 3 from production components F1, F2, F3, F41, F42, F5 of a production plant with a store L from which, e.g., material is drawn and/or into which finished products are placed. Furthermore, e.g., one component F41, F42 of the production components F1, F2, F3, F41, F42, F5 is redundantly configured. The individual production components F1, F2, F3, F41, F42, F5 of the production plant N2 are connected via the connecting components K1, K2, K3, K41, K41, K5 of the communication network N1 to the communication network N1, whereby the connecting components K1, K2, K3, K41, K42, K5 are functional or software components of respective production components. Furthermore, in the communication network N1, a central unit can be provided in which the digital models M1, M2 of the two networks N1, N2, the digital component models KMx, the sequence PA of a configuration change are created and administered and a central process sequence control is performed.

If, in a connecting component K5 with which a production component F5 is associated, for example, an updating for safety reasons or an error rectification must be performed, then via the inventive method for configuration change, a decentrally executable and temporally optimized sequence PA of the configuration change can again be created. For this purpose, in the network modeling step 101 and in the component modeling step 102, the corresponding digital models M1, M2 of the networks N1, N2 and the component models KMx of the connecting components K1, K2, K3, K3, K41, K42, K5 are created. Thereby, for example, the components F1, F2, F3, F41, F42, F5 of the production plant N2, the components 31, 32, K1, K2, K3, K41, K41, K5 in the communication network N1 and, as a connection to the production plant N2, the topology of the communication network N1 and the production sequences, e.g., as part of the topology of the production plant N2, can be modeled. Based on the models M1, M2, KMx, effects of configuration changes in both the networks N1, N2 can then be analyzed.

In the sequence creation step 103, a sequence PA for the configuration change, e.g., of the component K5 of the communication network N1 is then determined based on the created models M1, M2 of the networks N1, N2 and the component models KMx. From this sequence PA, the conditions for the most frictionless possible continuous production are then fulfilled in that, e.g., firstly a production sequence is redirected through a reconfiguration of the plant with the updating component K5 or the associated production component F5 or that, e.g., an intermediate store L is activated.

Through the disassembly of the sequence PA into decentrally executable sequence units PAVx in the disassembly step 104, the decentralized sequence units PAVx and thus a monitoring of the configuration change can be placed in the communication network N1 such that the sequence and a possibly required reversal remains restricted to a smallest possible region of the communication network and as far as possible does not influence an operative communication in the remainder of the system (communication network N1 and production plant N2).

In order to keep the influencing of the networks N1, N2 low, for example, the updating of the component K5 or the new version for the component K5 in the execution step 105 can be outsourced to the sequence control unit S2. Furthermore, the redundancy of components F41, F42 of the production plant N2 can be taken into account in the sequence PA. For this purpose, in the disassembly step 104, the sequence PA of the configuration change can be temporally disassembled such that, for example, the components K41, K42 of the communication network N1 assigned to the redundantly provided production components F41, F42 are updated one after the other in the execution step 105 in order to meet the condition of a continuous production process.

The optimizations of the sequence PA of the configuration change which are described on the basis of FIG. 3 by way of example, are taken into account automatically by the inventive method in the creation of the sequence PA of the configuration changes on the basis of the digital models M1, M2 of the networks N1, N2 and the digital component models KMx without, for example, a user having to intervene manually in the sequence planning process.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for changing a configuration of connected networks, at least two networks consisting of components being connected via at least one connecting component, and at least one of the at least two networks being a communication network, the method comprising:
creating digital models of the at least two networks based on network analyses;
creating digital component models for the at least one connecting component, in a respective digital component model, at least one respective interaction of the at least one connecting component being represented via properties of one of the at least two networks;
deriving a sequence of a configuration change based on the created digital models of the at least two networks and the created digital component models for the at least one connecting component;
disassembling the sequence of the configuration change into decentrally executable sequence units; and
distributing and executing the decentrally executable sequence units while taking into temporal and spatial dependencies on at least one decentralized sequence control unit in at least one of the at least two networks.

2. The method as claimed in claim 1, wherein the sequence of the configuration change is created, stored and administered by a centralized control component in one network of the at least two networks.

3. The method as claimed in claim 2, wherein the sequence of the configuration change is created, stored and administered by the centralized control component in the communication network.

4. The method as claimed in claim 2, wherein a transfer of the decentrally executable sequence units to the at least one specifiable decentralized sequence control unit is performed by the central control component.

5. The method as claimed in claim 2, wherein the sequence of the configuration change is created, stored and administered by a centralized control component in the communication network.

6. The method as claimed in claim 1, wherein the sequence of the configuration change is created, stored and administered decentralized, in a coordinated manner in one network of the at least two networks.

7. The method as claimed in claim 6, wherein the sequence of the configuration change is created, stored and administered decentralized, in the coordinated manner in the communication network.

8. The method as claimed in claim 6, wherein the sequence of the configuration change is created, stored and administered decentralized, in a coordinated manner in the communication network.

9. The method as claimed in claim 1, wherein the digital models of at least one of (i) the at least two networks and (ii) the digital component models are continually adapted based on the execution of the decentrally executable sequence units.

10. The method as claimed in claim 1, wherein one of (i) at least one component in one network of the at least two networks is specified as at least one decentralized sequence control unit and (ii) at least one component in one of the at least two networks is dynamically selected based on the sequence of the configuration change.

11. The method as claimed in claim 1, wherein, for the at least one decentralized sequence control unit, a component is utilized which has one of (i) a control functionality and (ii) which is dynamically equipped with the control functionality based on the sequence of the configuration change.

12. The method as claimed in claim 1, wherein the sequence of the configuration change is created as a temporally and spatially decentrally controllable structure.

13. The method as claimed in claim 1, wherein for a continual adaptation of the digital component models, one of (i) learning algorithms are utilized and (ii) a behavior of the at least two connected networks is utilized.

14. The method as claimed in one claim 1, wherein a network analysis of at least one network of the at least two networks is performed automatically or at least partially automatically.

15. The method as claimed in claim 1, wherein at least one of the at least two networks comprises one of (i) an energy supply network, (ii) a production system and (iii) a building management system.

* * * * *